United States Patent [19]
Davis et al.

[11] Patent Number: 5,822,029
[45] Date of Patent: Oct. 13, 1998

[54] ILLUMINATION SYSTEM AND DISPLAY DEVICE

[75] Inventors: Gillian Margaret Davis, Oxfordshire; Kathryn Walsh, Reading, both of United Kingdom

[73] Assignee: Sharp Kabushiki Kaisha, Osaka, Japan

[21] Appl. No.: 581,380

[22] Filed: Dec. 29, 1995

[30] Foreign Application Priority Data

Dec. 29, 1994 [GB] United Kingdom .................. 9426329

[51] Int. Cl.⁶ .............................................. G02F 1/1335
[52] U.S. Cl. ........................................................ 349/115
[58] Field of Search .................... 349/115, 176, 349/97, 185

[56] References Cited

U.S. PATENT DOCUMENTS

| | | | |
|---|---|---|---|
| 3,669,525 | 6/1972 | Adams et al. | 349/176 |
| 3,679,290 | 7/1972 | Adams et al. | 349/176 |
| 4,987,410 | 1/1991 | Berman et al. | 340/705 |
| 5,054,888 | 10/1991 | Jacobs et al. | 359/76 |
| 5,221,982 | 6/1993 | Jaris | 359/93 |
| 5,235,443 | 8/1993 | Barnik et al. | 359/37 |
| 5,267,060 | 11/1993 | Colton | 359/15 |
| 5,295,009 | 3/1994 | Barnik et al. | 359/65 |
| 5,325,218 | 6/1994 | Willett et al. | 359/53 |
| 5,486,935 | 1/1996 | Kalmanash | 349/185 |
| 5,619,355 | 4/1997 | Sharp et al. | 349/78 |

FOREIGN PATENT DOCUMENTS

| | | |
|---|---|---|
| 0578302 | 1/1994 | European Pat. Off. . |
| 0606940 | 7/1994 | European Pat. Off. . |
| 0634674 | 1/1995 | European Pat. Off. . |
| 5066476 | 3/1993 | Japan . |
| 6130424 | 5/1994 | Japan . |
| 2260203 | 4/1993 | United Kingdom . |

OTHER PUBLICATIONS

European Search for Application No. 95309518.9: dated Mar. 17, 1997.
R. Maurer et al., SID 94 Digest, 1994, "26.1: Cholesteric Reflectors with a Color Pattern", pp. 399–402.
Robert Maurer, et al., SID 90 Digest, 1990, "7.6: Polarizing Color Filters made from Cholesteric LC Silicones", pp. 110–113.
Search Report for U.K. Appl. 9426329.0, mailed Mar. 20, 1995.
Schadt et al., Jap. Journal of Appl. Phys., vol. 29. No. 10, Oct. 1990, 1990, pp. 1974–1984, "New Liquid Crystal Polarized Color Projection Principles."

*Primary Examiner*—William L. Sikes
*Assistant Examiner*—James Dudek

[57] ABSTRACT

An illumination system includes a polarized light source which emits circularly polarized light of a particular handedness and a cholesteric filter having a region arranged to transmit circularly polarized light falling within a first wavelength band and to reflect other wavelengths of circularly polarized light. A reflector redirects the reflected light back towards the cholesteric filter. The cholesteric filter can include a first layer having portions which reflect red, green and blue light while transmitting other colors, and a second layer identical to the first layer but out of alignment therewith so that each region of the filter transmits only one color of light, the other colors being reflected.

32 Claims, 5 Drawing Sheets

ILLUMINATION SYSTEM AND DISPLAY DEVICE

This invention relates to an illumination system, and to a display device.

Colour liquid crystal display devices commonly comprise a light source and a liquid crystal display including a plurality of picture elements, each of which aligned with one of the colour filter elements of an array of such filter elements. Each of the colour filter elements transmits light falling within a particular wavelength band and absorbs all other light incident thereon. In devices arranged to transmit red, green and blue light, the filters absorb a large proportion of the light incident thereon. It is usual for the filter elements to be integral with the display, ie between the glass substrates thereof.

In addition, liquid crystal display devices include polarising films which are arranged to transmit one polarisation of light. These films therefore further reduce the intensity of light incident upon the liquid crystal display.

GB 2260203 describes a device in which a holographic element is used to filter the light incident upon a liquid crystal display, the holographic element comprising a plurality of regions, each of which is arranged to diffract light of a particular wavelength or wavelength band out of a lightguide, and to have no affect on light falling outside of that band. The use of holographic elements is inconvenient in that they are difficult to mass produce.

It is known, for example from U.S. Pat. Nos. 5,235,443, 5,295,009 and a paper in the Japanese Journal of Applied Physics 29, 1974, 1990, that cholesteric liquid crystal polymers can be used as colour filters and as circular polarisers. For instance, U.S. Pat. Nos. 5,235,443 and 5,295,009 disclose the use of cholesteric liquid crystal polymers for polarising monochromatic light. Unpolarised light from a monochromatic light source is divided into left- and right-handed circularly polarised light. Light of one polarisation is transmitted. Light of the orthogonal polarisation has its polarisation reversed and Is reflected back through the polariser so as to provide light having a single handedness of circular polarisation.

U.S. Pat. No. 5,325,218 and EP 0 634 674 also disclose the use of cholesteric elements as polarisers.

U.S. Pat. No. 5,267,060 discloses a colour matrix display having a holographic optical element which acts as a colour matrix reflective filter. Each pixel of the filter transmits light of one colour and reflects light of other colours. The reflected light is returned to a reflective light assembly for reuse. In addition, U.S. Pat. No. 5,221,982 describes a thin colour pixelated light source using cholesteric materials for use in a backlight of a colour liquid crystal display. The device comprises a laminate of layers of cholesteric material having different optical properties, the laminate being sliced at an angle of 45° and polished to form a complex colour pixelated element. Such a construction is difficult to produce.

According to a first aspect of the present invention there is provided an illumination system as defined in the appended claim 1.

According to a second aspect of the invention, there is provided a display device as defined in the appended claim 28.

Preferred embodiments of the invention are defined in the other appended claims.

Because substantially all of the light emitted by the light source is incident upon the display, the brightness of the display is increased and hence the efficiency of the device is improved. A further advantage is that the illumination system is relatively compact.

The invention will further be described by way of example with reference to the accompanying drawings, in which like reference numerals denote like parts, and in which.

Figure 1:
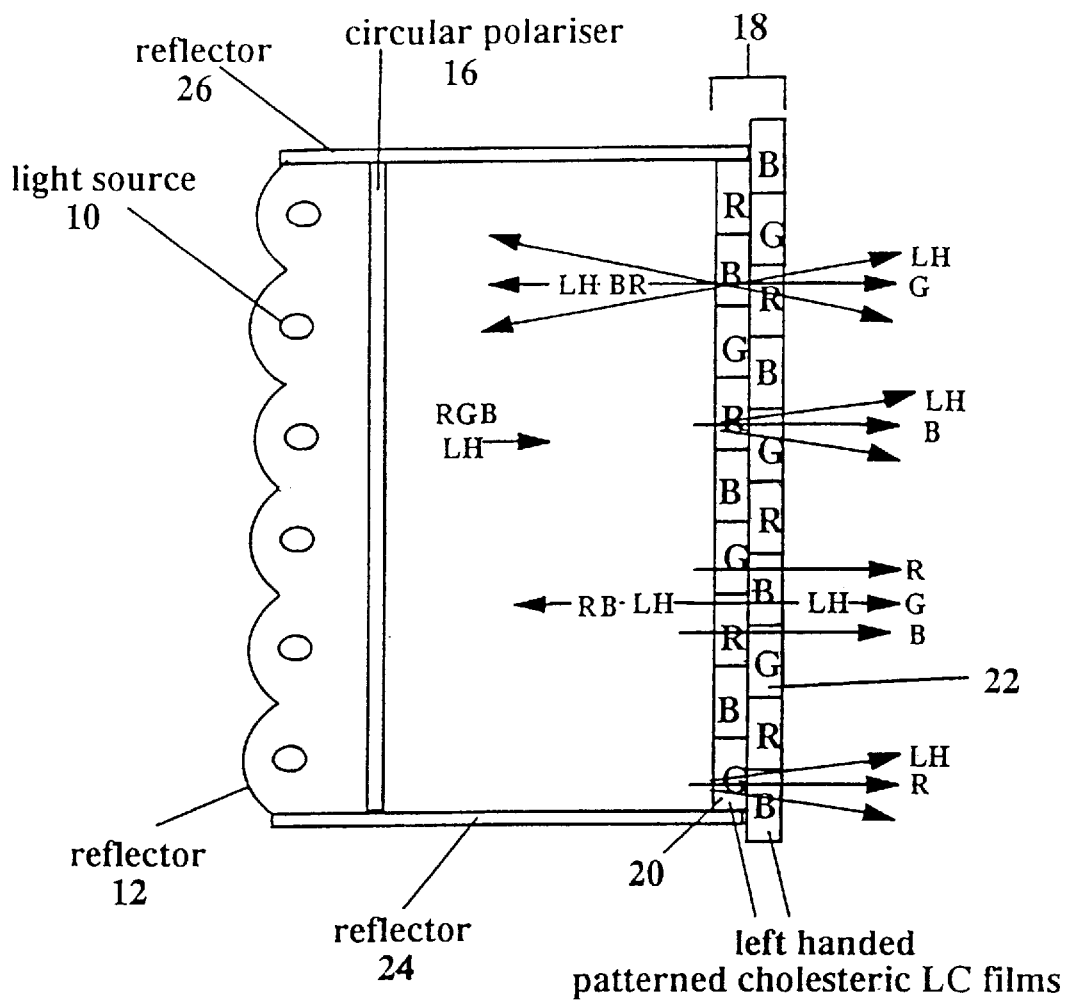
FIG. 1 is a diagrammatic view of an illumination system constituting a first embodiment of the invention.

The illumination system illustrated in FIG. 1 comprises a light source 10 consisting of an array of fluorescent tubes, a "serpentine" tube or one or more flat fluorescent lamps as described in U.S. Pat. No. 4,978,888 arranged to emit white light having components falling within, say, three wavelength bands of, say, 20 nm width; the wavelength bands comprising a red wavelength band centred on approximately 610 nm, a green wavelength band centre on approximately 540 nm and a blue wavelength band centred on approximately 450 nm. A reflector 12 is provided behind the light source 10 in order to direct light emitted thereby towards a liquid crystal display device. The light is then incident upon a circular polariser 16 which comprises a linear polariser which absorbs one polarisation of light whilst transmitting the orthogonal polarisation, and a quarter wave plate which converts the plane polarised light incident thereon into circularly polarised light Since the light incident upon the quarter wave plate is linearly polarised, all of the circularly polarised light transmitted thereby is of the same handedness, for example left-handed circularly polarised light.

The circularly polarised light transmitted by the circular polariser 16 is incident upon a cholesteric filter 18 which comprises a first layer 20 and a second layer 22. The cholesteric filter 18 is preferably provided between the substrates of the liquid crystal display device. The first and second layers 20, 22 each comprise patterned cholesteric liquid crystal polymer films which are patterned so as to include portions which reflect red light, transmitting the blue and green components, portions which reflect blue light transmitting the red and green light components, and portions which reflect the green light, transmitting the red and blue components, the letters R, G and B in FIG. 1 denoting the colour of the light reflected by each portion. As shown in FIG. 1, the portions of the first and second layers 20, 22 are out of alignment with one another, so that, for example, the blue and green light transmitted by one of the portions of the first layer 20 is incident upon a portion of the second layer 22 which reflects blue light, transmitting only the green component (the red component having been reflected by the first layer), and a portion of the second layer 22 which reflects green light, transmitting only the blue component. Thus, each region of the filter 18 transmits only one of the three wavelengths, the other two wavelengths being reflected.

The light which is reflected by the filter 18 returns through the circular polariser 16 which converts the left-handed circularly polarised light into linearly polarised light which is reflected by the reflector 12, and returns through the circular polariser 16 to be incident upon the filter 18 once more. Reflectors 24 and 26 are arranged to substantially prevent light escaping from the sides of the illumination system. Any component of the light which is again reflected by the filter 18 will once more be reflected by the reflector 12, the light being repeatedly reflected by the reflector 12 and filter 18 until the light is incident upon a region of the filter 18 which transmits light of that wavelength band.

In use, the liquid crystal layer of the liquid crystal display is positioned adjacent the filter 18, possibly separated therefrom by additional layers, such as the display's electrodes and/or alignment layers, each pixel of the display being aligned with a respective region of the filter 18 so as to receive only one colour of light. By controlling the amount of red, green and blue light transmitted by the display by controlling the state of the liquid crystal in each pixel, a full colour display can be achieved.

Figure 2:
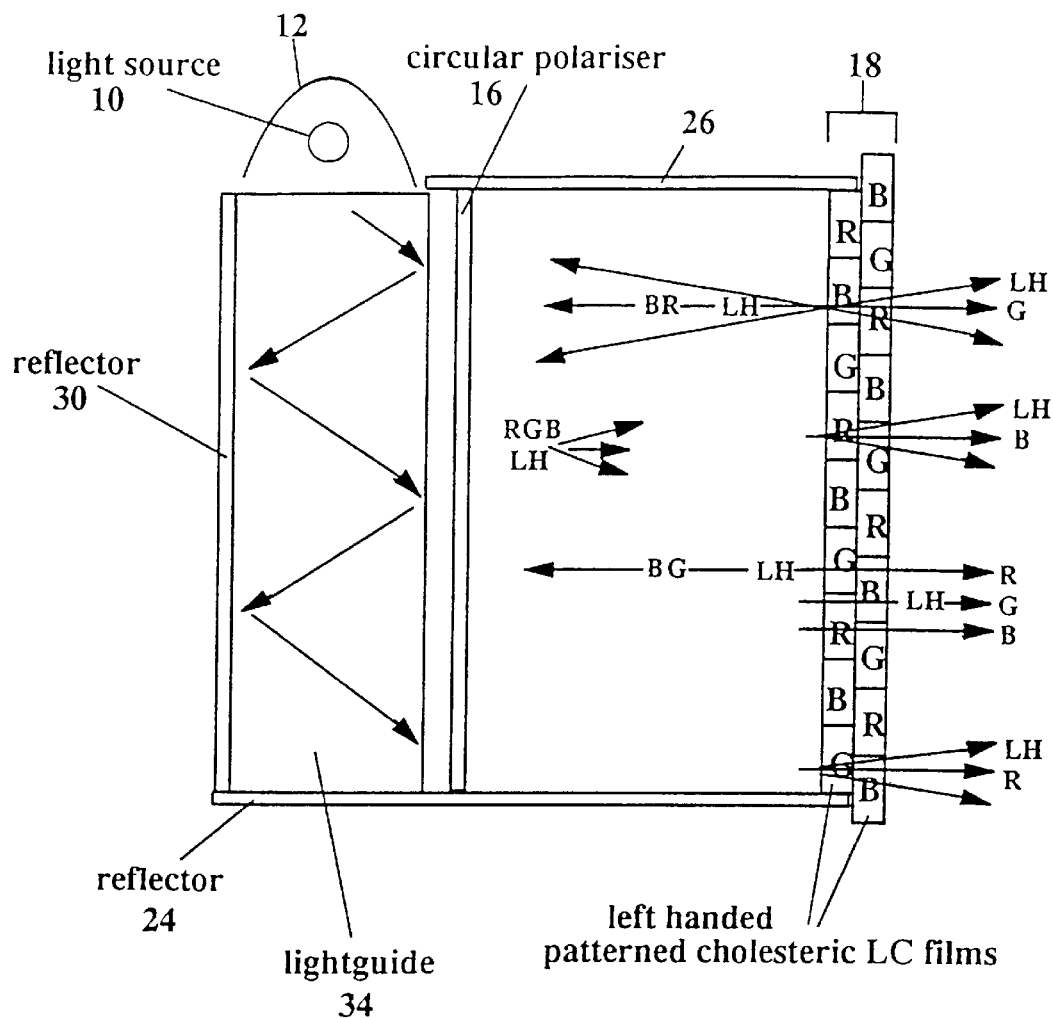
FIG. 2 is a diagrammatic view of an illumination system constituting a second embodiment of the invention.

The illumination system illustrated in FIG. 2 is similar to that illustrated in FIG. 1 but is an edgelit system rather than a backlit system as shown in FIG. 1. Rather than using an array of fluorescent tubes or lamps, a single fluorescent tube or lamp is used, a reflector 12, for example a metallic mirror, being provided behind the source 10 to direct the light emitted therefrom towards a lightguide 34. A reflector 30, for example a metallic mirror or microprism array, is arranged to direct the light out of the lightguide 34 towards a circular polariser 16 as described with reference to FIG. 1. In this embodiment, the light reflected by the filter 18 will ideally not be incident upon the reflector 12 and the fluorescent lamp, the reflector 30 being arranged to reflect the light back through the circular polariser towards the filter 18. Operation of this device is as described above.

Figure 3:
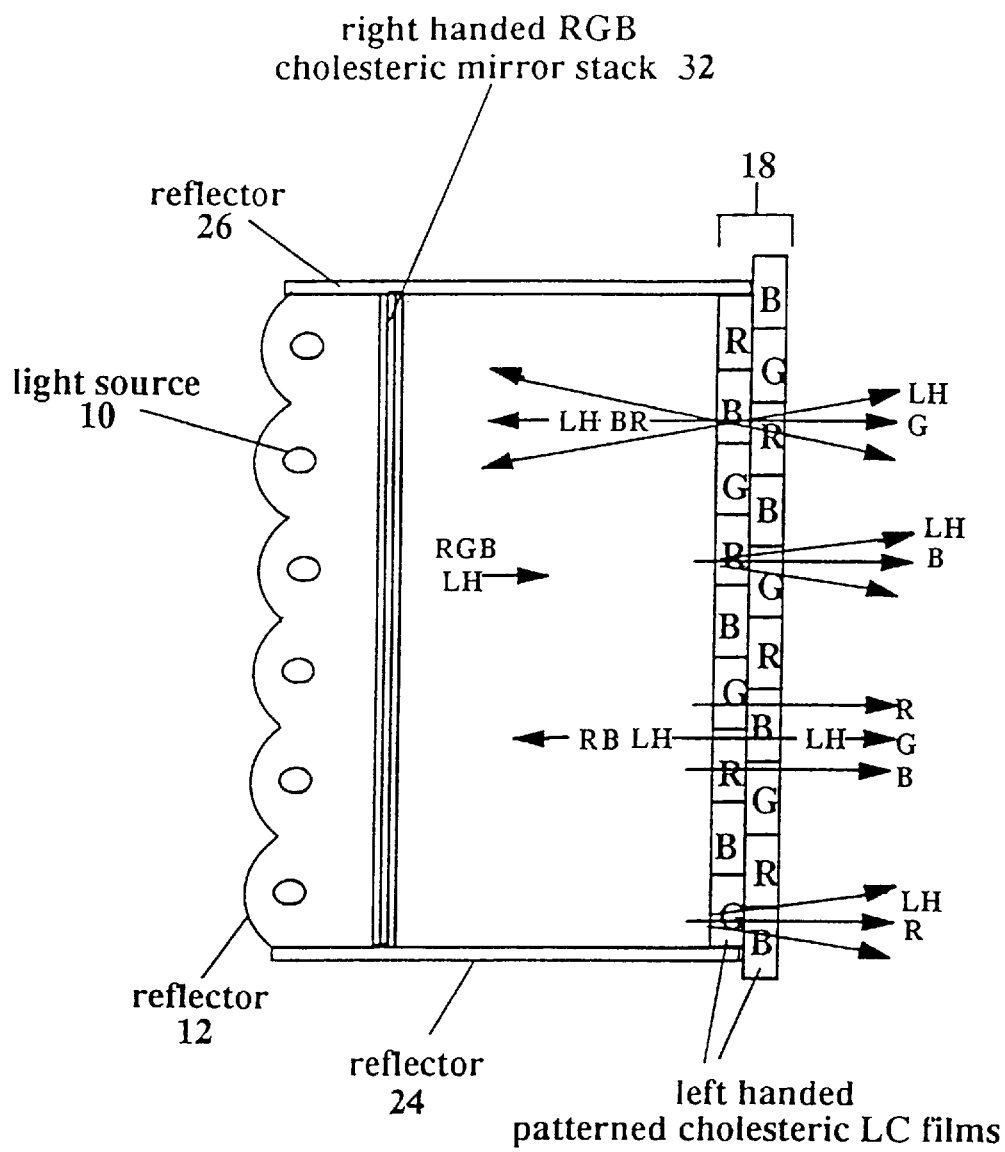
FIG. 3 is a view similar to FIG. 1 illustrating a modification of the first embodiment.
Figure 4:
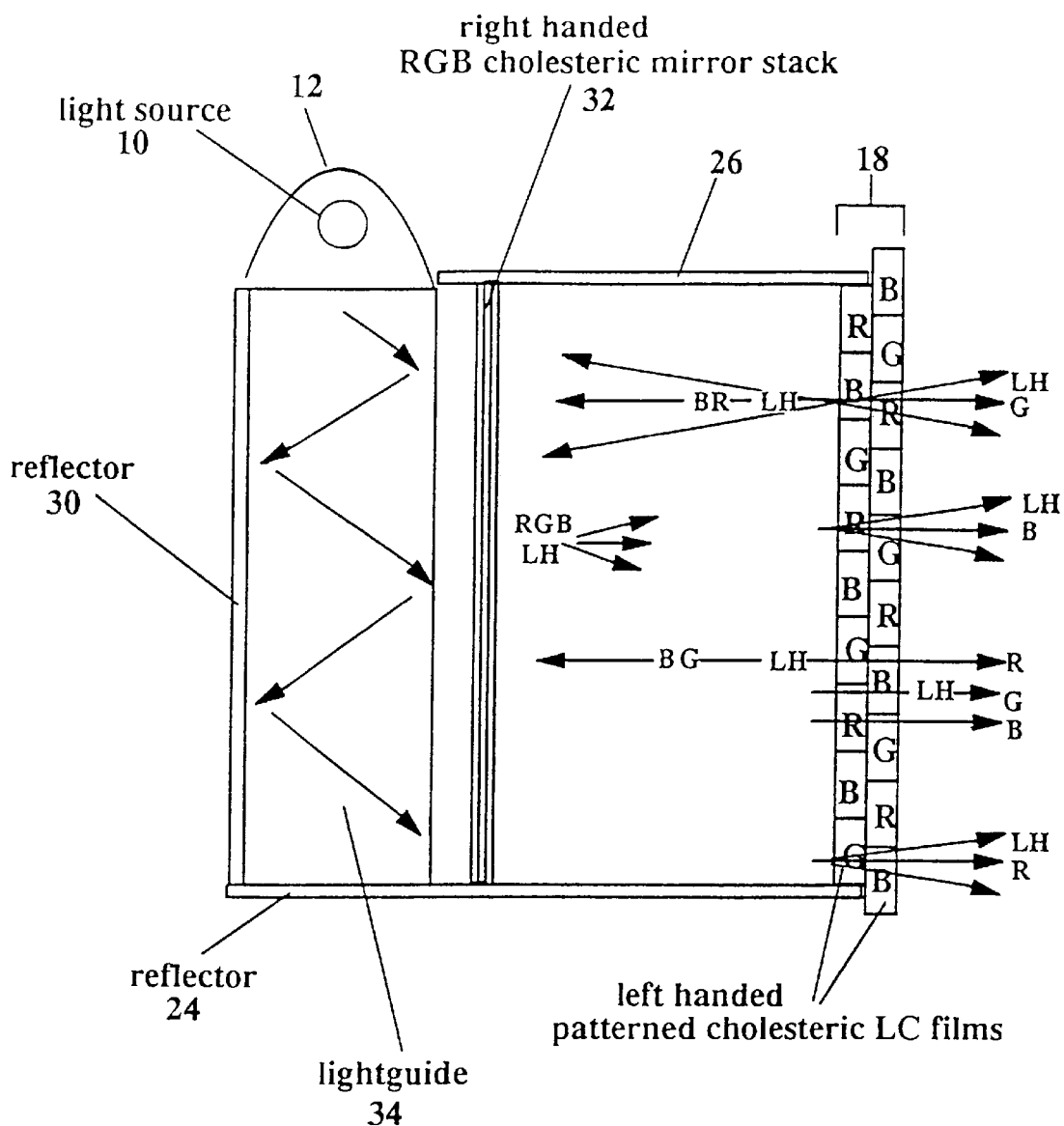
FIG. 4 is a view similar to FIG. 2 illustrating a modification of the second embodiment.

The embodiments illustrated in FIGS. 3 and 4 differ from those illustrated in FIGS. 1 and 2 in that the circular polariser 16 illustrated in the embodiments of FIGS. 1 and 2 is replaced by a cholesteric mirror stack 32. As an alternative to the stack 32, a broadband polariser of the type disclosed in EP 0 606 940 may be used. The stack 32 is arranged to transmit only left-handed circularly polarised light. Any right-handed circularly polarised light incident on the stack 32 is reflected and, on being reflected by the reflector 12 in the embodiment of FIG. 3 or by the reflector 30 in the embodiment of FIG. 4, the polarisation state of this light is reversed and hence it will be transmitted by the stack 32 on returning from the reflector 12 or 30.

The light transmitted by the stack 32 is incident upon the filter 18 where, as described previously, certain components of the light are transmitted, other components being reflected by the filter 18. The reflected components return towards and are transmitted by the stack 32, after which the light is incident upon the reflector 12 or 30. On reflection by the reflector 12 or 30, the left-handed circularly polarised light is converted to right-handed circularly polarised light which is reflected at the stack 32 to be incident once more upon the reflector 12 or 30. The right-handed circularly polarised light is converted to left-handed circularly polarised light on reflection at the reflector 12 or 30, and so will be able to pass through the stack 32.

The mirror stack 32 is arranged to include a layer which reflects light of the red band, a layer which reflects light of the blue band, and a layer which reflects light of the green band.

In the embodiments illustrated in FIGS. 3 and 4, the cholesteric mirror stack 32 is arranged to reflect right-handed circularly polarised light while the filter 18 is arranged to reflect left-handed circularly polarised light. Alternatively, the stack 32 and filter 18 may be arranged to reflect left-handed and right-handed circularly polarised light, respectively. As a further alternative, the stack 32 and filter 18 may be arranged to reflect the same handedness of circularly polarised light, a half wave plate being provided between the stack 32 and filter 18 to convert the polarisation of the light from one handedness to the opposite handedness.

In use, each of the above described illumination systems is disposed adjacent, a liquid crystal display device. Alternatively and more preferably, the filter 18 is integral with the liquid crystal display device. The filter 18 is disposed as close as possible to a liquid crystal layer of the display device in order to minimise cross-talk between pixels of different colours. It has been found that a cholesteric film of thickness approximately 10 $\mu$m can reflect substantially all of the light of one colour and handedness. The total thickness of the filter 18 is therefore approximately 20 $\mu$m. If any light of the incorrect colour is transmitted by the first and second layers 20, 22, such light could be absorbed using an array of colour filters arranged to absorb light having a wavelength falling outside a predetermined band. Since only a small amount of light of the incorrect colour is likely to pass through the filter 18, the amount of light being absorbed by such colour filters will be small. The efficiency of the device with therefore not be substantially reduced. The provision of such absorbing colour filters furthers reduces problems associated with light from outside the system being reflected by the cholesteric filter.

In order to produce a ±60° field of view, the size of each portion of the layers 20, 22 must be at least 70 $\mu$m, and hence each pixel of the display is at least 35 $\mu$m.

The angular acceptance bandwidth of a single pitch cholesteric liquid crystal material is typically ±20°. This is less than the typical angular field of view of a liquid crystal display. One technique for increasing the bandwidth of the cholesteric material is to provide a plurality of different pitches in each portion of material, for example, where a thermochromic material is used, by varying the temperature of the material while applying ultraviolet light to fix the material. Alternatively, a more collimated light source may be used, the light emitted thereby falling within the angular acceptance bandwidth of the material. Where such a light source is used, any diffuser placed before the cholesteric filter is preferably relatively weak, the light remaining within the angular acceptance bandwidth of the material. In order to increase the angular view of the device, a relatively strong diffuser may be positioned between the filter 18 and the viewing positions. If such a diffuser is provided between the filter 18 and the liquid crystal layer, the diffuser should be a polarisation preserving diffuser. However, a polarisation preserving type of diffuser is not required if the diffuser is provided between the final polariser and the viewing positions.

If the liquid crystal device requires linearly polarised light rather than circularly polarised light as is transmitted by the embodiments illustrated in FIGS. 1 to 4, then a patterned quarter wave plate or broadband quarter wave plate can be provided after the filter 18. Such a patterned quarter wave plate may be fabricated from a polymer which has been subjected to ultraviolet light to induce birefringence therein. Alternatively, an aligned liquid crystal polymer film may be used.

In a further modification, the circular polariser 16 of the embodiments of FIGS. 1 and 2 may be replaced by a polarisation selective holographic element which may be arranged to transmit circularly polarised light of a particular handedness, or to transmit plane polarised light which is converted to circularly polarised light by a quarter wave plate, The light which is not transmitted by the polarisation selective holographic element is reflected, the polarisation state is changed, and the light is returned to and transmitted by the polarisation selective holographic element.

Figure 5:
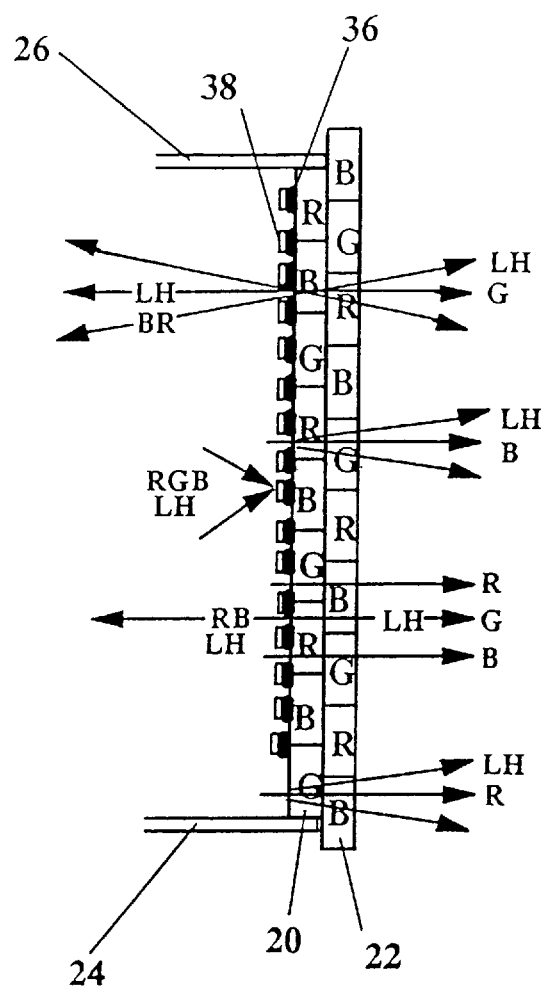
FIG. 5 is a diagrammatic view illustrating a modification of the embodiments shown in FIGS. 1 to 4.

A further factor which results in a reduction in the amount of light passing through an active matrix liquid crystal device is that light incident upon the thin film transistors (TFT's), the wiring and the black matrix (an absorber necessary for achieving high contrast is absorbed by these elements of the liquid crystal display device, and so does not contribute to illumination of the display. Such absorption of light results in a 30 to 50% reduction in light transmitted by the liquid crystal display. In order to reduce the amount of light lost in this way, an array of reflective material 36 and quarter wave retarders 38 is applied to the surface of the filter 18 facing the light source 10 (as shown in FIG. 5) so that the quarter wave retarders 38 are disposed in front of the reflective material 36 relative to the direction of light incident upon the latter. The reflective material 36 is positioned so as to reflect light which would otherwise be incident upon the TFT's, wiring, and the black matrix. The light incident upon the reflective material 36 is reflected back towards the light source 10 together with the light which is reflected by the filter 18. Since the light reflected by the reflective material 36 Is ultimately able to pass through the filter 18, and hence to pass through the liquid crystal device, the provision of the reflective material 36 increases the efficiency of the display.

In FIG. 5, left handed circularly polarized light is incident on the quarter wave retarder 38, and is converted to linearly polarized light by passing therethrough. Next, the linearly polarized light is incident upon the reflective material 36, and is reflected therefrom so as to enter the quarter wave retarder 38 again. The quarter wave retarder 38 converts the linearly polarized light from the reflective material 36 to left handed circularly polarized light. Therefore, the handedness of the circularly polarized light passing through the quarter wave retarder 38 from the reflective material 26 is the same as that of the circularly polarized light passing through the quarter wave retarder 38 towards the reflective material 36. On the other hand, if the quarter wave retarders 38 were not present, the left handed circularly polarized light would be incident on the reflective material 36 and would then be converted to right handed circularly polarized light by being reflected therefrom.

Although in the described embodiments the filter 18 comprises two layers, the filter may include more than two layers, each portion of each layer reflecting a single relatively small band of wavelengths. This is of particular importance where the light source does not emit three well defined bands of light. Further, the filter may not comprise well defined layers of cholesteric material, the wavelength reflected by each region of the filter being dependent upon the distance from the surface of the filter, for example.

In a modification to the above described embodiment, the first and second layers are not offset from one another, all of one portion of the first layer being aligned with all of a corresponding portion of the second layer. In use, the modification operates in exactly the same manner as described above, the pixel size of the liquid crystal display device in this case being substantially equal to that of each portion of each layer of the filter.

The patterned layers 20, 22 of the filter 18 may be fabricated by masking a substrate and applying the cholesteric material to apertures provided in the mask, or by masking certain parts of a cholesteric layer and removing or altering the properties of the exposed parts. The filter 18 may therefore be fabricated by using screen printing, spinning, dipping, optical lithography or like methods. Where a thermochromic cholesteric material is used, the temperature of the material may be adjusted until the desired reflection/transmission properties have been achieved, the properties then being fixed, for example by ultraviolet polymerisation of the material, or by ultraviolet crosslinking, the method being dependent upon the material used.

What is claimed is:

1. An illumination system comprising:
    a polarized light source for emitting circularly polarized light;
    a cholesteric filter having a first region which transmits circularly polarized light of a wavelength falling within a first predetermined band and reflects light having a wavelength falling outside of the first band, and a second region which transmits circularly polarized light of a wavelength falling within a second predetermined band different from the first predetermined band and reflects light having a wavelength falling outside of the second band; and
    a reflector for returning the light reflected by the cholesteric filter towards the cholesteric filter, wherein the boundary between the first region and the second region is a plane parallel to a direction of illumination.

2. An illumination system as claimed in claim 1, wherein the reflector returns the light reflected by the cholesteric filter towards the second region thereof.

3. An illumination system as claimed in claim 1, wherein the cholesteric filter further comprises at least one further region which transmits circularly polarized light of a wavelength falling within a respective predetermined band different to the first and second bands, and reflects light of a wavelength falling outside of the respective predetermined band.

4. An illumination system as claimed in claim 1, wherein the reflector and the cholesteric filter are arranged to repeatedly reflect light of a predetermined wavelength therebetween until the light of the predetermined wavelength is incident upon a region of the cholesteric filter transmitting the light of the predetermined wavelength.

5. An illumination system as claimed in claim 1, wherein each of the first region and the second region of the cholesteric filter comprises a plurality of layers, each of the layers transmitting circularly polarized light of a wavelength falling outside of a predetermined range and reflecting circularly polarized light of a wavelength falling within the predetermined range, the band of wavelengths transmitted by all of the layers defining the predetermined range for that region.

6. An illumination system as claimed in claim 5, wherein each of the layers comprises a film superimposed upon an adjacent one of the layers.

7. An illumination system as claimed in claim 5, wherein the cholesteric filter comprises two layers.

8. An illumination system as claimed in claim 5, wherein each of the layers of the cholesteric filter comprises a plurality of portions, each of the portions transmitting circularly polarized light of a wavelength falling outside of a respective range and reflecting circularly polarized light of a wavelength falling within the predetermined range.

9. An illumination system as claimed in claim 8, wherein the portions overlap with one another such that each of the first region and the second region of the cholesteric filter is defined by an overlapping part of the portions.

10. An illumination system as claimed in claim 1, wherein the cholesteric filter comprises a cholesteric liquid crystal polymer.

11. An illumination system as claimed in claim 1, wherein the light source comprises a fluorescent source for emitting light of wavelengths falling within substantially distinct wavelength bands.

12. An illumination system as claimed in claim 11, wherein at least one of the distinct wavelength bands is within the first predetermined band of the cholesteric filter.

13. An illumination system as claimed in claim 1, wherein the light source comprises a circular polarizer.

14. An illumination system as claimed in claim 13, wherein the circular polarizer is an absorbing polarizer.

15. An illumination system as claimed in claim 14, wherein the absorbing polarizer comprises an absorbing plane polarizer and a quarter wave plate.

16. An illumination system as claimed in claim 13, wherein the circular polarizer is a reflecting polarizer.

17. An illumination system as claimed in claim 16, wherein the reflecting polarizer comprises a cholesteric mirror which transmits circularly polarized light of a first handedness and reflects circularly polarized light of a second handedness opposite to the first handedness.

18. An illumination system as claimed in claim 17, wherein the cholesteric mirror includes a first layer reflecting light of the first wavelength band and a second layer reflecting light of the second wavelength band.

19. An illumination system as claimed in claim 18, wherein the cholesteric mirror further comprises at least one additional layer, the at least one additional layer reflecting light of wavelength falling within a respective additional predetermined band.

20. An illumination system as claimed in claim 16, wherein the reflecting polarizer comprises a polarization selective holographic element.

21. An illumination system as claimed in claim 20, wherein the holographic element transmits circularly polarized light.

22. An illumination system as claimed in claim 20, wherein the holographic element transmits plane polarized light, and wherein the polarized light source further comprises a quarter wave plate.

23. An illumination system as claimed in claim 13, wherein the handedness of the circularly polarized light transmitted by the circular polarizer is the same as that of the light transmitted by the cholesteric filter.

24. An illumination system as claimed in claim 13, wherein the handedness of the circularly polarized light transmitted by the circular polarizer is opposite to that of the light transmitted by the cholesteric filter.

25. An illumination system as claimed in claim 23, further comprising converting means for converting the circularly polarized light from one handedness to the opposite handedness.

26. An illumination system as claimed in claim 25, wherein the converting means comprises a half wave plate.

27. An illumination system as claimed in claim 1, wherein the reflector converts the polarization of the light incident thereon from one handedness to the opposite handedness.

28. A display device comprising an illumination system as claimed in claim 1 and a spatial light modulator.

29. A display device as claimed in claim 28, wherein the spatial light modulator comprises a liquid crystal display.

30. A display device as claimed in claim 29, wherein the cholesteric filter is integral with the liquid crystal display.

31. A display device as claimed in claim 29, further comprising reflective material for reflecting light away from non-transmissive parts of the liquid crystal display.

32. A display device as claimed in claim 31, further comprising quarter wave retarders disposed in front of the reflective material relative to the direction of light incident upon the reflective material so that the light passes through the quarter wave retarders before and after reflection from the reflective material.

* * * * *